US012360751B2

(12) United States Patent
Nastacio et al.

(10) Patent No.: US 12,360,751 B2
(45) Date of Patent: Jul. 15, 2025

(54) AUTOMATED PRODUCT WORKFLOW USABILITY ASSESSMENT

(71) Applicant: International Business Machines Corporation, Armonk, NY (US)

(72) Inventors: Denilson Nastacio, Apex, NC (US); Kevin M Lefebvre, Cary, NC (US); Michele Chilanti, Rochester, MN (US); Sundari Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 18/305,429

(22) Filed: Apr. 24, 2023

(65) Prior Publication Data

US 2024/0354087 A1    Oct. 24, 2024

(51) Int. Cl.
*G06F 8/60* (2018.01)
*G06F 8/73* (2018.01)
*G06F 8/77* (2018.01)

(52) U.S. Cl.
CPC ............... *G06F 8/60* (2013.01); *G06F 8/73* (2013.01); *G06F 8/77* (2013.01)

(58) Field of Classification Search
CPC ........ G06F 8/60; G06F 9/455; G06F 11/2733; G06F 11/3668; G06F 11/3692; G06F 11/3684
See application file for complete search history.

(56) References Cited

U.S. PATENT DOCUMENTS

| 6,754,612 | B1* | 6/2004 | Vanfladern | G06F 11/3428 |
| | | | | 714/E11.2 |
| 8,136,106 | B2 | 3/2012 | Franaszek | |
| 8,806,444 | B1* | 8/2014 | Podgorny | G06F 11/3452 |
| | | | | 717/121 |
| 9,549,024 | B2 | 1/2017 | Leekley | |
| 9,588,879 | B2 | 3/2017 | Horovitz | |
| 10,068,069 | B1 | 9/2018 | Jacobi | |
| 11,175,814 | B2 | 11/2021 | Torbey | |
| 2011/0081051 | A1 | 4/2011 | Tayal | |
| 2014/0052853 | A1 | 2/2014 | Mestres | |
| 2021/0081308 | A1* | 3/2021 | Golubev | G06F 11/3688 |

(Continued)

FOREIGN PATENT DOCUMENTS

GB    2473513 B    2/2012

OTHER PUBLICATIONS

"Automate Your Customer Due Diligence for More Efficient Compliance Workflows", LexisNexis® Automated Risk Assessment for Financial Crime Compliance, 2022, 4 pages.

(Continued)

*Primary Examiner* — Qing Chen
*Assistant Examiner* — Amir Soltanzadeh
(74) *Attorney, Agent, or Firm* — Eric W. Chesley

(57) ABSTRACT

An approach for assessing a user experience with a product deployment. The approach embeds markers in documentation associated with a product. The approach embeds the markers in the product, correlated with the marker positions in the documentation. The approach calculates metrics, associated with timings between markers, based on deployment of the product by a user. The approach generates a report of an experience of the user in deploying the product.

20 Claims, 3 Drawing Sheets

(56) References Cited

U.S. PATENT DOCUMENTS

2021/0342167 A1* 11/2021 Anand .............. G06F 11/3086
2022/0350734 A1* 11/2022 Coutinho Moraes ......................
G06F 11/302

OTHER PUBLICATIONS

"Method and System for Assessing the Business Risk of a Software Application and Using That to Automate Workflow Based Deployment", An IP.com Prior Art Database Technical Disclosure, Authors et. al.: Disclosed Anonymously, IP.com No. IPCOM000265443D, IP.com Electronic Publication Date: Apr. 9, 2021, 11 pages.

"Persuasive Software Method Adoption and Standardization", An IP.com Prior Art Database Technical Disclosure, Authors et. al.: Disclosed Anonymously, IP.com No. IPCOM000225092D, IP.com Electronic Publication Date: Jan. 24, 2013, 6 pages.

"Smarter Information Lifecycle Management", An IP.com Prior Art Database Technical Disclosure, Authors et. al.: Disclosed Anonymously, IP.com No. IPCOM000207370D, IP.com Electronic Publication Date: May 27, 2011, 8 pages.

Ferre, et al., "Usability Basics for Software Developers", IEEE Software, Jan./Feb. 2001, 8 pages.

Garcia-Berna et al., "Automated Workflow for Usability Audits in the PHR Realm", International Journal of Environmental Research and Public Health, MDPI, Published Jul. 22, 2022, 19, 8947, https://doi.org/10.3390/jerph19158947, 30 pages.

\* cited by examiner

AUTOMATED PRODUCT WORKFLOW USABILITY ASSESSMENT

TECHNICAL FIELD

The present invention relates generally to workflow usability, and specifically, to automating workflow usability assessment.

BACKGROUND

The first experience with a product is dominant in the overall impression of the product for an extended time, if not for the life of the product. In many cases, a bad first experience may result in an initial product release being reduced in scope or cancelled.

One of the traditional mechanisms of assessing a product first experience are usability studies based on observing and/or interviewing product users. Another tactic is an automated approach in the form of gathering and quantifying interactions on the user interface. For example, compiling metrics such as a distance traveled by a mouse cursor and number of clicks on a mouse per a defined activity.

However, the advantages of these two approaches are diametrically opposed. For example, usability studies can extract deeper insights into a user's experience with the product. These usability studies can occur through direct observation and human interactions between researchers and product users. A downside to usability studies are they can consume considerable amounts of time and resources.

In another example, automated analysis can lower the time and resource requirements, but lacks the deep engagement with the product users, for instance, asking why a particular activity took more time and interactions than what the product designers originally envisioned.

BRIEF SUMMARY

According to an embodiment of the present invention, a computer-implemented method for assessing a user experience with a product deployment, the computer-implemented method comprising: embedding, by one or more processors, markers in documentation associated with a product; embedding, by the one or more processors, the markers in the product, correlated with the marker positions in the documentation; calculating, by the one or more processors, metrics, associated with timings between markers, based on deployment of the product by a user; and generating, by the one or more processors, a report of an experience of the user in deploying the product.

According to an embodiment of the present invention, a computer program product for assessing a user experience with a product deployment, the computer program product comprising: one or more non-transitory computer readable storage media and program instructions stored on the one or more non-transitory computer readable storage media, the program instructions comprising: program instructions to embed markers in documentation associated with a product; program instructions to embed the markers in the product, correlated with the markers positions in the documentation; program instructions to calculate metrics, associated with timings between markers, based on deployment of the product by a user; and program instructions to generate a report of an experience of the user in deploying the product.

According to an embodiment of the present invention, a computer system for assessing a user experience with a product deployment, the computer system comprising: one or more computer processors; one or more non-transitory computer readable storage media; and program instructions stored on the one or more non-transitory computer readable storage media, the program instructions comprising: program instructions to embed markers in documentation associated with a product; program instructions to embed the markers in the product, correlated with the markers positions in the documentation; program instructions to calculate metrics, associated with timings between markers, based on deployment of the product by a user; and program instructions to generate a report of an experience of the user in deploying the product.

Other aspects and embodiments of the present invention will become apparent from the following detailed description, which, when taken in conjunction with the drawings, illustrate by way of example the principles of the invention.

DETAILED DESCRIPTION

Figure 1:
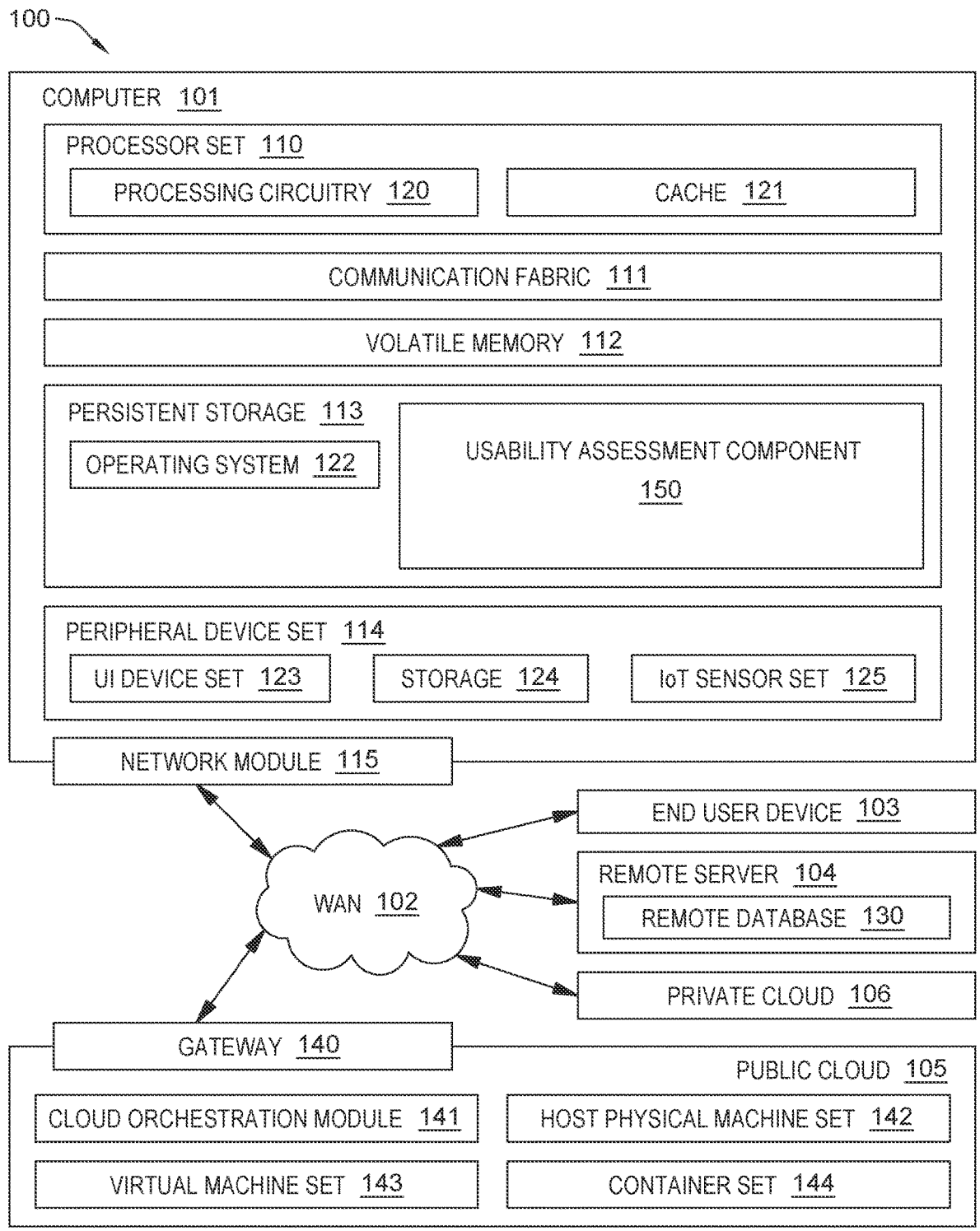
FIG. 1 depicts a cloud computing environment and a high-level architecture, in accordance with at least one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as usability assessment component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or Open Source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
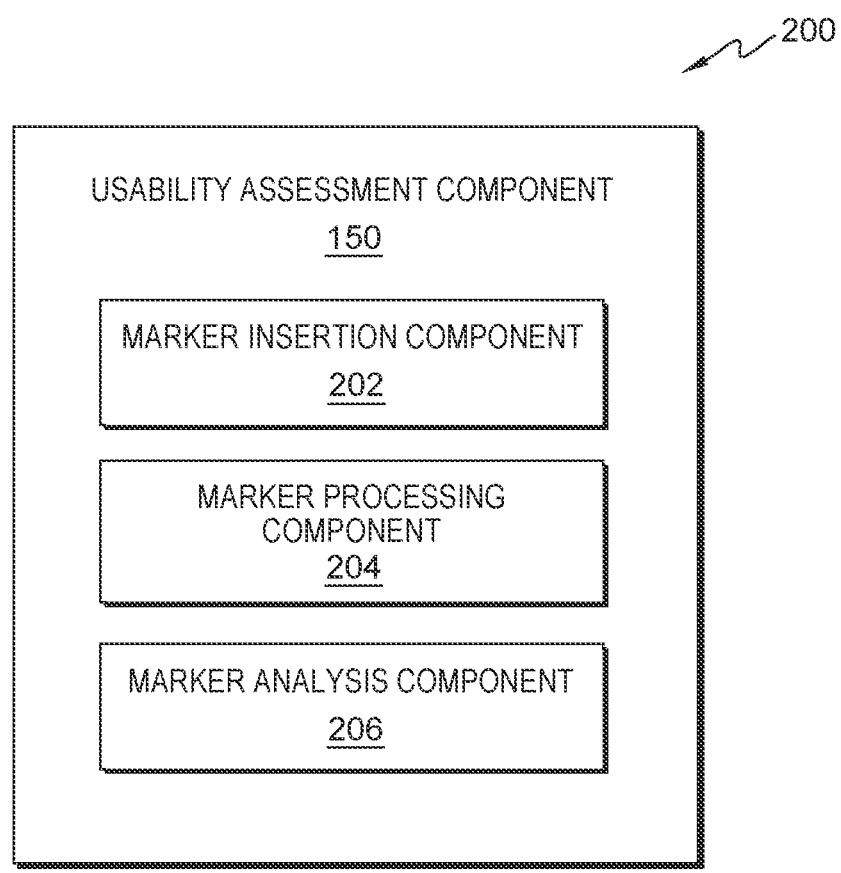
FIG. 2 depicts an exemplary detailed architecture, in accordance with at least one embodiment of the present invention.
Figure 3:
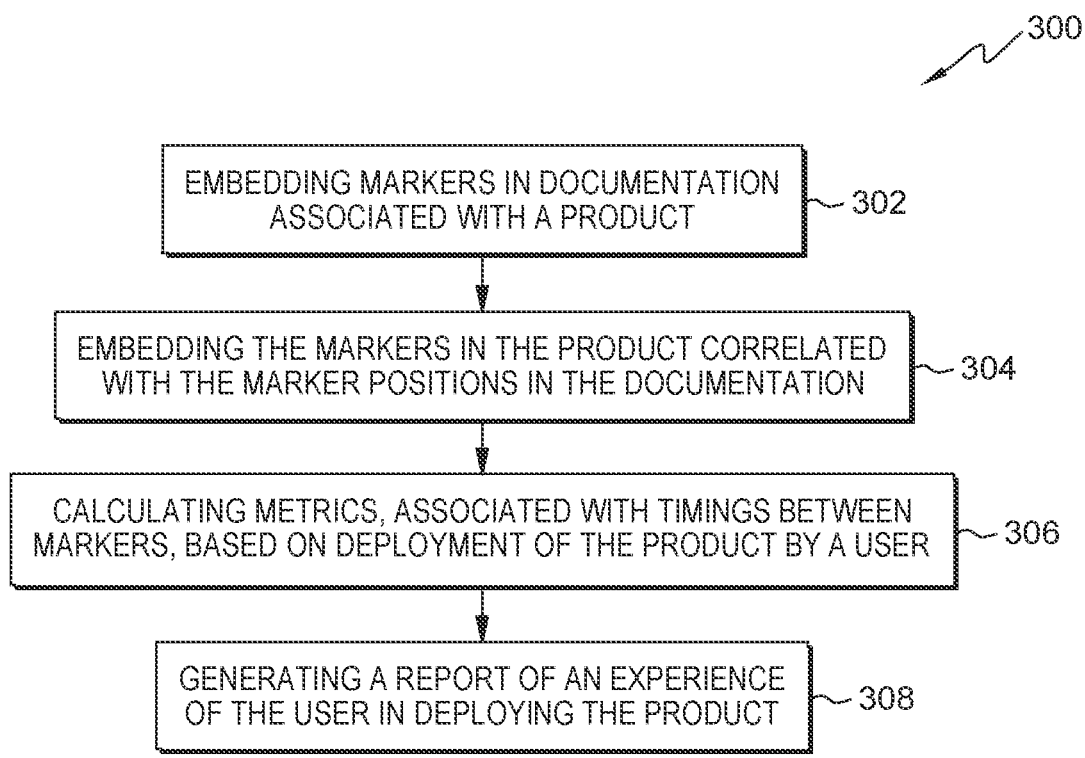
FIG. 3 is a flowchart of a method, in accordance with at least one embodiment of the present invention.

FIG. 2 is an exemplary detailed architecture for performing various operations of FIG. 3, in accordance with various embodiments. The architecture 200 may be implemented in accordance with the present invention in any of the environments depicted in FIGS. 1 and 3, among others, in various embodiments. Of course, more or less elements than those specifically described in FIG. 2 may be included in architecture 200, as would be understood by one of skill in the art upon reading the present descriptions.

Each of the steps of the method 300 (described in further detail below) may be performed by any suitable component of the architecture 200. A processor, e.g., processing circuit(s), chip(s), and/or module(s) implemented in hardware and/or software, and preferably having at least one hardware component, may be utilized in any device to perform one or more steps of the method 300 in the architecture 200. Illustrative processors include, but are not limited to, a central processing unit (CPU), an application specific integrated circuit (ASIC), a field programmable gate array (FPGA), etc., combinations thereof, or any other suitable computing device known in the art.

Architecture 200 provides a detailed view of at least some of the components of architecture 200. Architecture 200 can comprise usability assessment component 150, which can further comprise marker insertion component 202, marker processing component 204, and marker analysis component 206. In one aspect of an embodiment of the present invention, usability assessment component 150 can augment product documentation with strategic markers in instruction steps and correlate them with the flow of activities in the target system. In another aspect of an embodiment of the present invention, usability assessment component 150 can track the markers through a target system receiving the markers, and infer a user is following a specific page in the instructions and then correlate target system activity, e.g., time of execution, time between instructions, failures, etc. with user commands associated with the markers. Accordingly, usability assessment component 150 can perform an assessment of data and can provide useful information to a development organization in terms of local improvements to the documentation of a challenging step in the installation process or in terms of a global assessment of the overall experience for purposes of measuring customer experience and predicting business growth, like information provided as part of a Net Promoter Score (NPS).

In one aspect of an embodiment of the present invention, marker insertion component 202 can provide the capability to insert markers into code samples and instructions of product documentation. It should be noted that the markers can be transferred from the documents to the target system through the usual copy-and-paste of content while following the product instructions. In another aspect of an embodiment of the present invention, marker insertion component 202 can provide the capability to insert specific marker types into the product instructions. It should be noted that product development and ID agree on the type of marker that will be present in the product online documents and detected in the running product code.

Furthermore, marker insertion component 202 can be static or automatically generated. It should be noted that automatically generated markers are preferred because they allow the inclusion of timestamps or other session-like identifiers that can further enrich the data sent to the running product code. It should further be noted that markers can be the contents of code samples, like special characters in a description field, labels in a Kubernetes® custom resource, etc.

In another aspect of an embodiment of the present invention, marker insertion component 202 can provide the capability to select a format for the markers based on the artifact being annotated, e.g., markdown, Portable Document Format (PDF), Microsoft Word file (DOC), etc. For example, for markdown, where code samples start with the annotation ""<syntax_name>," the marker can be ""<syntax_name>_uxassessment>." It should be noted that some formats, e.g., PDF and DOC, their document format comprises a built-in rich text format incorporating generic text markers. Accordingly, embodiments of the present invention can define a marker named "ux-assessment" to be placed around relevant portions of the document, e.g., an entire code sample, a single line of code, a manual instruction, etc.

In one aspect of an embodiment of the present invention, marker insertion component 202 can provide the capability to insert the markers in the code itself as function calls that record their occurrence in an archive such as, but not limited to a log entry. In another aspect of an embodiment of the present invention, marker insertion component 202 can provide the capability to instrument the source code based on annotations in function headers instructing the runtime to send a "start marker" call before the function starts and a "end marker" call after the function ends or based on a developer directly invoking the functions to start and end the marked section.

In another aspect of an embodiment of the present invention, marker insertion component 202 can provide the capability to place the markers in artifacts, e.g., documents, sample code, production code, etc., that are already versioned as part of development activities for any open source or commercial product. Product development can keep an inventory of the various markers spread across the product through a simple mechanism such as, but not limited to, scanning the source code and source documentation for the markers.

In one aspect of an embodiment of the present invention, marker processing component 204 can provide the capability to execute the tracking based on the input from product development, e.g., the extent of the tracking would be a choice made by product development, favoring steps where a better understanding of the interactions between the user and the product are desired. It should be noted that a cost balance exists between choosing the points where markers will be applied and validating the placement, so organizations may want to balance the addition of the markers with the value derived from that better understanding provided by the markers.

In one aspect of an embodiment of the present invention, marker processing component 204 can provide the capability to calculate metrics based on markers associated with an application. For example, marker processing component 204 can provide the capability to calculate a time between a user providing commands containing a marker, where the marker maps back to a step in the documentation; identify markers expected but missed between other markers, indicating that the user may have accidentally missed or intentional skipped one or more steps; determine the number of underlying system errors while executing the steps, note this can be caused by failures in dependencies, problems in the commands, missing steps, etc.; a count of the number of times the same command or series of commands was attempted to be completed, etc.

In one aspect of an embodiment of the present invention, marker analysis component 206 can provide the capability to provide conclusions and predictions to product development and documentation teams. In another aspect of an embodiment of the present invention, marker analysis component 206 can provide the capability to determine and report time intervals exceeding predetermined time intervals between execution of documented steps in a workflow. It should be noted that the time intervals can be between consecutive steps or between endpoints of a series of consecutive steps. In another aspect of an embodiment of the present invention, marker analysis component 206 can provide the capability to report system errors upon execution of documented steps in a workflow. In another aspect of an embodiment of the present invention, marker analysis component 206 can provide the capability to report missing documented steps between steps in a single workflow.

FIG. 3 is an exemplary flowchart of a method 300 for assessing a user experience with a product deployment. At step 302, an embodiment can embed, via marker insertion component 202, markers in documentation associated with a product. At step 304, the embodiment can embed, via marker insertion component 202, markers in the product, correlated with the marker positions in the documentation. At step 306, the embodiment can calculate, via marker processing component 204, metrics, associated with timings between markers, based on deployment of the product by a user. At step 308, the embodiment can generate, via marker analysis component 206, a report of an experience of the user in deploying the product.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for assessing a user experience with a product deployment, the computer-implemented method comprising:
    embedding, by one or more processors, markers in product instruction documentation for a product;
    embedding, by the one or more processors, the markers in source code of the product, correlated with marker positions in the product instruction documentation;
    detecting, by the one or more processors, the markers embedded in executing product code during deployment of the product, the product code comprising machine readable code derived from the source code;
    tracking, by the one or more processors, detection of the markers in the executing product code through a target system during the deployment of the product in conjunction with processing of the markers in the product instruction documentation as the user follows the product instruction documentation;
    calculating, by the one or more processors, metrics associated with timings between the processing of the markers in the product instruction documentation and the detecting of the markers in the executing product code; and
    generating, by the one or more processors, a report of an experience of the user in deploying the product.

2. The computer-implemented method of claim 1, wherein the markers are static markers or automatically generated markers.

3. The computer-implemented method of claim 2, wherein the automatically generated markers comprise at least one of timestamps or session identifiers.

4. The computer-implemented method of claim 1, wherein the markers comprise one or more of contents of code samples, special characters in a description field and labels in an orchestration system custom resource.

5. The computer-implemented method of claim 1, wherein the metrics comprise one or more of a time interval between consecutive markers, an identity of a missing marker, a count of system errors detected while deploying the product, and a count of how many times one or more commands were executed more than once.

6. The computer-implemented method of claim 1, wherein the report comprises one or more of longer than expected time intervals between execution of documented steps in a single workflow, system errors detected upon execution of documented steps in a single workflow and missing documented steps between steps in a single workflow.

7. The computer-implemented method of claim 1, wherein the report is sent to an associated development team and an associated documentation team to use in updating deployment procedures.

8. A computer program product for assessing a user experience with a product deployment, the computer program product comprising:
one or more non-transitory computer readable storage media and program instructions stored on the one or more non-transitory computer readable storage media, the program instructions comprising:
program instructions to embed markers in product instruction documentation for a product;
program instructions to embed the markers in source code of the product, correlated with marker positions in the product instruction documentation;
program instructions to detect, by a processor, the markers embedded in executing product code during deployment of the product, the product code comprising machine readable code derived from the source code;
program instructions to track detection of the markers in the executing product code through a target system during deployment of the product in conjunction with processing of the markers in the product instruction documentation as the user follows the product instruction documentation;
program instructions to calculate metrics associated with timings between the processing of the markers in the product instruction documentation and the detection of the markers in the executing product code; and
program instructions to generate a report of an experience of the user in deploying the product.

9. The computer program product of claim 8, wherein the markers are static markers or automatically generated markers.

10. The computer program product of claim 9, wherein the automatically generated markers comprise at least one of timestamps or session identifiers.

11. The computer program product of claim 8, wherein the markers comprise one or more of contents of code samples, special characters in a description field and labels in an orchestration system custom resource.

12. The computer program product of claim 8, wherein the metrics comprise one or more of a time interval between consecutive markers, an identity of a missing marker, a count of system errors detected while deploying the product, and a count of how many times one or more commands were executed more than once.

13. The computer program product of claim 8, wherein the report comprises one or more of longer than expected time intervals between execution of documented steps in a single workflow, system errors detected upon execution of documented steps in a single workflow and missing documented steps between steps in a single workflow.

14. The computer program product of claim 8, wherein the report is sent to an associated development team and an associated documentation team to use in updating deployment procedures.

15. A computer system for assessing a user experience with a product deployment, the computer system comprising:
one or more computer processors;
one or more non-transitory computer readable storage media; and
program instructions stored on the one or more non-transitory computer readable storage media, the program instructions comprising:
program instructions to embed markers in product instruction documentation for a product;
program instructions to embed the markers in source code of the product, correlated with marker positions in the product instruction documentation;
program instructions to detect, by the one or more computer processors, the markers embedded in executing product code during deployment of the product, the product code comprising machine readable code derived from the source code;
program instructions to track detection of the markers in the executing product code through a target system during deployment of the product in conjunction with processing of the markers in the product instruction documentation as the user follows the product instruction documentation;
program instructions to calculate metrics associated with timings between the processing of the markers in the product instruction documentation and the detection of the markers in the executing product code; and
program instructions to generate a report of an experience of the user in deploying the product.

16. The computer system of claim 15, wherein the markers are static markers or automatically generated markers and the automatically generated markers comprise at least one of timestamps or session identifiers.

17. The computer system of claim 15, wherein the markers comprise one or more of contents of code samples, special characters in a description field and labels in an orchestration system custom resource.

18. The computer system of claim 15, wherein the metrics comprise one or more of a time interval between consecutive markers, an identity of a missing marker, a count of system errors detected while deploying the product, and a count of how many times one or more commands were executed more than once.

19. The computer system of claim 15, wherein the report comprises one or more of longer than expected time intervals between execution of documented steps in a single workflow, system errors detected upon execution of documented steps in a single workflow and missing documented steps between steps in a single workflow.

20. The computer system of claim 15, wherein the report is sent to an associated development team and an associated documentation team to use in updating deployment procedures.

* * * * *